(12) United States Patent
Tsutsumi et al.

(10) Patent No.: US 11,780,571 B2
(45) Date of Patent: Oct. 10, 2023

(54) MULTICOPTER

(71) Applicant: HONDA MOTOR CO., LTD., Tokyo (JP)

(72) Inventors: Daiko Tsutsumi, Saitama (JP); Yoshitaka Minagawa, Saitama (JP); Masashi Kato, Saitama (JP); Yuji Ishitsuka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 467 days.

(21) Appl. No.: 17/054,612

(22) PCT Filed: Apr. 18, 2019

(86) PCT No.: PCT/JP2019/016641
§ 371 (c)(1),
(2) Date: Nov. 11, 2020

(87) PCT Pub. No.: WO2019/244462
PCT Pub. Date: Dec. 26, 2019

(65) Prior Publication Data
US 2021/0101675 A1    Apr. 8, 2021

(30) Foreign Application Priority Data
Jun. 22, 2018    (JP) ................. 2018-118540

(51) Int. Cl.
*B64C 27/20*    (2023.01)
*B64C 29/00*    (2006.01)
(Continued)

(52) U.S. Cl.
CPC .............. *B64C 27/08* (2013.01); *B60L 50/60* (2019.02); *B64C 27/20* (2013.01);
(Continued)

(58) Field of Classification Search
CPC .... B64C 29/0025; B64U 10/13; B64U 30/26; B64U 2101/61; B64D 27/20
See application file for complete search history.

(56) References Cited

U.S. PATENT DOCUMENTS

2005/0230524 A1    10/2005    Ishiba
2007/0034739 A1    2/2007    Yoeli
(Continued)

FOREIGN PATENT DOCUMENTS

CN    107416194 A    12/2017
JP    2005125976 A    5/2005
(Continued)

OTHER PUBLICATIONS

Office Action for Patent Application JP 2020-525300, dated Aug. 3, 2021; 5 pp.
PCT International Search Report for Japanese Patent Application No. PCT/JP2019/016641 dated May 28, 2019; 4 pp.

*Primary Examiner* — Timothy D Collins
*Assistant Examiner* — Justin Michael Heston
(74) *Attorney, Agent, or Firm* — Armstrong Teasdale LLP (57) ABSTRACT

Provided is a multicopter providing a high level of freedom in compact design, and consuming a relatively small amount of energy. The multicopter (10) includes a machine body (12), an N number of first lift generators (30) arranged on a first concentric circle (C1) centered substantially around a gravitational center (G) of the machine body (12) and in a front part and a rear part of the machine body in a bilateral symmetry, and an M number of second lift generators (70) arranged on a second concentric circle (C2) centered substantially around the gravitational center (G) of the machine body (12) and having a larger diameter than the first concentric circle (C1), and in a front part and a rear part of the machine body (12) on a central axial line (X) extending in
(Continued)

a fore and aft direction of the machine body (12), N being greater than M.

8 Claims, 4 Drawing Sheets

(51) Int. Cl.
*B64C 27/08* (2023.01)
*B60L 50/60* (2019.01)
*B64D 27/24* (2006.01)
*B64D 31/00* (2006.01)

(52) U.S. Cl.
CPC .......... *B64C 29/0025* (2013.01); *B64D 27/24* (2013.01); *B64D 31/00* (2013.01); *B60L 2200/10* (2013.01)

(56) References Cited

U.S. PATENT DOCUMENTS

| 2010/0140415 | A1 | 6/2010 | Goossen |
| 2016/0068261 | A1 | 3/2016 | Niederberger |
| 2017/0247107 | A1* | 8/2017 | Hauer ................... B64C 39/024 |
| 2017/0341776 | A1* | 11/2017 | McClure ............ G01C 21/1656 |
| 2018/0037317 | A1* | 2/2018 | Ichihara .................. B64C 27/28 |
| 2018/0065735 | A1* | 3/2018 | Ichihara .................. B64C 25/32 |

FOREIGN PATENT DOCUMENTS

| JP | 2009513435 A | 4/2009 |
| JP | 2010132280 A | 6/2010 |
| JP | 2014240242 A | 12/2014 |
| JP | 2016522113 A | 7/2016 |
| JP | 2016219941 A | 12/2016 |
| WO | 2016136848 A1 | 4/2017 |

* cited by examiner

MULTICOPTER

CROSS-REFERENCE TO RELATED APPLICATIONS

This application is a U.S. National Phase Application of PCT/JP2019/016641, filed on Apr. 18, 2019. PCT/JP2019/016641 claims the benefit of Japanese Patent Application No. 2018-118540, filed on Jun. 22, 2018. These applications are hereby expressly incorporated by reference in their entirety.

TECHNICAL FIELD

The present invention relates to a multicopter.

BACKGROUND ART

Known multicopters include those provided with a plurality of lift generators each provided with a rotating blade in a front part and a rear part of a machine body provided with an occupant seat (see Patent Document 1, for instance), and those provided with a plurality of annular frames arranged on a common circle and each provided with a plurality of lift generators (rotor units) and a fuselage carrying an imaging camera in a central part thereof (see Patent Document 2, for instance).

PRIOR ART DOCUMENT(S)

Patent Document(s)

Patent Document 1: JP2005-125976A
Patent Document 2: JP2014-240242A

SUMMARY OF THE INVENTION

Task to be Accomplished by the Invention

An important task for multicopters is a compact design for reduction of the necessary lift and maximization of flight time, or in other words, for an improved energy efficiency. In the case of the multicopter disclosed in Patent Document 1, since all of the lift generators are positioned in the front and rear parts of the machine body within the lateral expanse of the machine body, the fore and aft length of the machine body undesirably increases. When relatively large lift generators are used, the lateral width of the machine body increases further. Thus, this prior art is not suitable for compact design.

Since the basic traveling (flight) direction of a multicopter is a forward direction, in order to reduce energy consumption and to achieve a favorable acceleration characteristic in the fore and aft direction, it is desired that the attitude control in the pitch direction is required to be performed in an efficient manner, as compared to the attitude control in the roll direction. In the case of the multicopter disclosed in Patent Document 2, since the machine body is isotropic on a horizontal project plane, there is no difference between the sensitivity of the attitude control in the pitch direction and the sensitivity of the attitude control in the roll direction, and it is not possible to perform the attitude control in the pitch direction more efficiently than the attitude control in the roll direction. Furthermore, in the case of the multicopter disclosed in Patent Document 2, since the machine body is isotropic on a horizontal project plane, the air resistance to the flight in the lateral direction is not different from the air resistance to the flight in the forward direction so that excessive energy consumption is inevitable.

In addition, in the case of the multicopter disclosed in Patent Document 2, a plurality of lift generators are arranged immediately around the central part of the machine body so that an occupant may be hindered by the lift generators in reaching the central part of the machine body in a comfortable manner, and this makes the multicopter unsuitable for personal transportation.

An object of the present invention is to provide a multicopter providing a high level of freedom in compact design, and consuming a relatively small amount of energy. Another object of the present invention is to improve the speed and acceleration performances of the multicopter in the fore and aft direction, and improve the riding comfort.

Means to Accomplish the Task

A multicopter (10) according to one embodiment of the present invention comprises: a machine body (12); an N number of first lift generators (30) arranged on a first concentric circle (C1) centered substantially around a gravitational center (G) of the machine body (12) and in a front part and a rear part of the machine body (12) in a bilateral symmetry; and an M number of second lift generators (70) arranged on a second concentric circle (C2) centered substantially around the gravitational center (G) of the machine body (12) and having a larger diameter than the first concentric circle (C1), and in a front part and a rear part of the machine body (12) on a central axial line (X) extending in a fore and aft direction of the machine body (12), N being greater than M.

Thereby, a high degree of freedom in the compact design of the multicopter (10) can be achieved, and the energy consumption for flight can be reduced owing to the weight reduction resulting from the compact design. Further, the front projection area can be minimized, and the speed performance and the acceleration performance in the fore and aft direction can be improved.

In this multicopter (10), preferably, a fore and aft distance between one of the first lift generators (30) located in the front part and one of the first lift generators (30) located in the rear part, and a fore and aft distance between one of the second lift generators (70) located in the front part and one of the second lift generators (70) located in the rear part are larger than a lateral distance between a pair of the first lift generators (30) that are in a bilateral symmetry to each other.

Thereby, the multicopter has a higher sensitivity to the fore and aft moment (moment around pitch axis) than to the lateral moment (moment around roll axis) so that an anisotropy that causes the multicopter to be more readily moveable under a fore and aft moment than under a lateral moment can be achieved with a highly compact and lightweight design, and the speed performance and the acceleration performance in the fore and aft direction can be improved.

In this multicopter (10), preferably, the first lift generators (30) and the second lift generators (70) are each provided with a rotary blade (34, 38, 74, 78), the rotary blade (74, 78) of the second lift generators (70) having a greater radius than the rotary blade (34, 38) of the first lift generators (30).

Thereby, the acceleration/deceleration performance in the fore and aft flight can be improved.

In this multicopter (10), preferably, each second lift generator (70) includes a part overlapping with an adjacent one of the first lift generators (30) in side view.

Thereby, the fore and aft length of the multicopter (10) is reduced. Further, the distance between the second lift generators (70) is increased, and the climb property of the machine body (12) is improved.

In this multicopter (10), preferably, the first lift generators (30) and the second lift generators (70) are each supported by the machine body (12) via a pair of arms (42, 44, 82, 84) extending from two different points on the machine body (12) and joined to each other at the corresponding lift generator (30, 70) in a shape of letter V in plan view.

Thus, the first lift generators (30) and the second lift generators (70) can be each reliably supported with a high rigidity without complicating the structure, as compared with the case where a single arm is used. As a result, the structural efficiency is improved so that the weight is reduced, and the acceleration/deceleration performance in the fore and aft flight is improved.

In this multicopter (10), preferably, the machine body (12) includes a main machine body (14) having a rectangular box shape elongated in the fore and aft direction, a front machine body (16) extending forward from a front end of the main machine body (14) and having a progressively narrower width toward a front end thereof, the front machine body (16) having a part extending into a space defined between a pair of the first lift generators (30) that are in a bilateral symmetry to each other in the front part, a rear machine body (18) extending rearward from a rear end of the main machine body (14) and having a progressively narrower width toward a rear end thereof, the rear machine body (18) having a part extending into a space defined between a pair of the first lift generators (30) that are in a bilateral symmetry to each other in the rear part, a left machine body (20) having a rectangular box shape elongated in the fore and aft direction and provided on a left side of the main machine body (14), the left machine body having a part extending into a space defined between a pair of the first lift generators (30) that are located one behind another on a corresponding lateral side, and a right machine body (22) having a a rectangular box shape elongated in the fore and aft direction and provided on a right side of the main machine body (14), the right machine body having a part extending into a space defined between a pair of the first lift generators (30) that are located one behind another on a corresponding lateral side.

Thereby, the fore and aft length and the width of the multicopter (10) are reduced, and a compact design of the multicopter (10) can be achieved.

In this multicopter (10), preferably, the main machine body (14) has a greater height than the left machine body (20) and the right machine body (22), and a seat (112) for an occupant is positioned on the main machine body (14), the left machine body (20) and the right machine body (22) each serving as a step for boarding and unboarding of the occupant and/or a footrest for the occupant seated on the seat (112).

The left machine body (20) and the right machine body (22) are thus conveniently used as footrests.

In this multicopter (10), preferably, the first lift generators (30) and the second lift generators (70) are each provided with a rotating blade (34, 38, 74, 78) and an electric motor (32, 36, 72, 76) for rotatively driving the rotating blade, and the main machine body (14), the left machine body (20) and the right machine body (22) each receive a power source battery (130) for powering the electric motor (32, 36, 72, 76) therein.

Thus, the main machine body (14), the left machine body (20), and the right machine body (22) are each effectively used as a storage box for the power supply battery (130).

In this multicopter (10), preferably, the main machine body (14) is provided with at least one of a gyro sensor (120), an acceleration sensor (121), and a flight control unit (122), and the front machine body (16) and the rear machine body (18) are each provided with a speed control unit (126) for the corresponding electric motors (32, 36, 72, 76).

Thereby, the gyro sensor (120) and the flight control device (122) are arranged in a relatively safe part located in the central part of the machine body, and the cables connecting the speed control unit (126) with the electric motors (32, 36, 72, 76) can be minimized in length.

Effect of the Invention

The multicopter according to the present invention thus provides a high level of freedom in compact design, and consumes relatively small amount of energy.

DESCRIPTION OF THE PREFERRED EMBODIMENT(S)

An embodiment of a multicopter according to the present invention is described in the following with reference to FIGS. 1 to 3.

The multicopter 10 of this embodiment has a machine body 12. The machine body 12 includes a main machine body 14 having a rectangular box shape elongated in the fore and aft direction, a front machine body 16 having a truncated pyramidal box shape which extends forward from the front end of the main machine body 14 and is progressively narrower in lateral width toward a front end part thereof, a rear machine body 18 having a truncated pyramidal box shape which extends rearward from the rear end of the main machine body 14 and is progressively narrower in lateral width toward a rear end part thereof, a left machine body 20 having a rectangular box shape elongated in the fore and aft direction and connected to the left side of the main machine body 14, and a right machine body 22 having a rectangular box shape elongated in the fore and aft direction and connected to the right side of the main machine body 14.

The front machine body 16 and the rear machine body 18 are arranged along a center line extending in the fore and aft direction of the main machine body 14, and are symmetrically to each other in the fore and aft direction. The left machine body 20 and the right machine body 22 are located on either lateral side of the main machine body 14, and each have a height approximately half the height of the main machine body 14. The left machine body 20 and the right machine body 22 are in bilaterally symmetric to each other.

The main machine body 14, the front machine body 16, the rear machine body 18, the left machine body 20 and the right machine body 22 each include a box body 14A, 16A, 18A, 20A, 22A having an open upper end, and a lid plate 14B, 16B, 18B, 20B, 22B consisting of a flat plate closing the open upper end of the corresponding box body 14A, 16A, 18A, 20A, 22A.

A leg assembly 26 including sleds each elongated in the fore and aft direction is attached to a lower part of the machine body 12.

Figure 2:
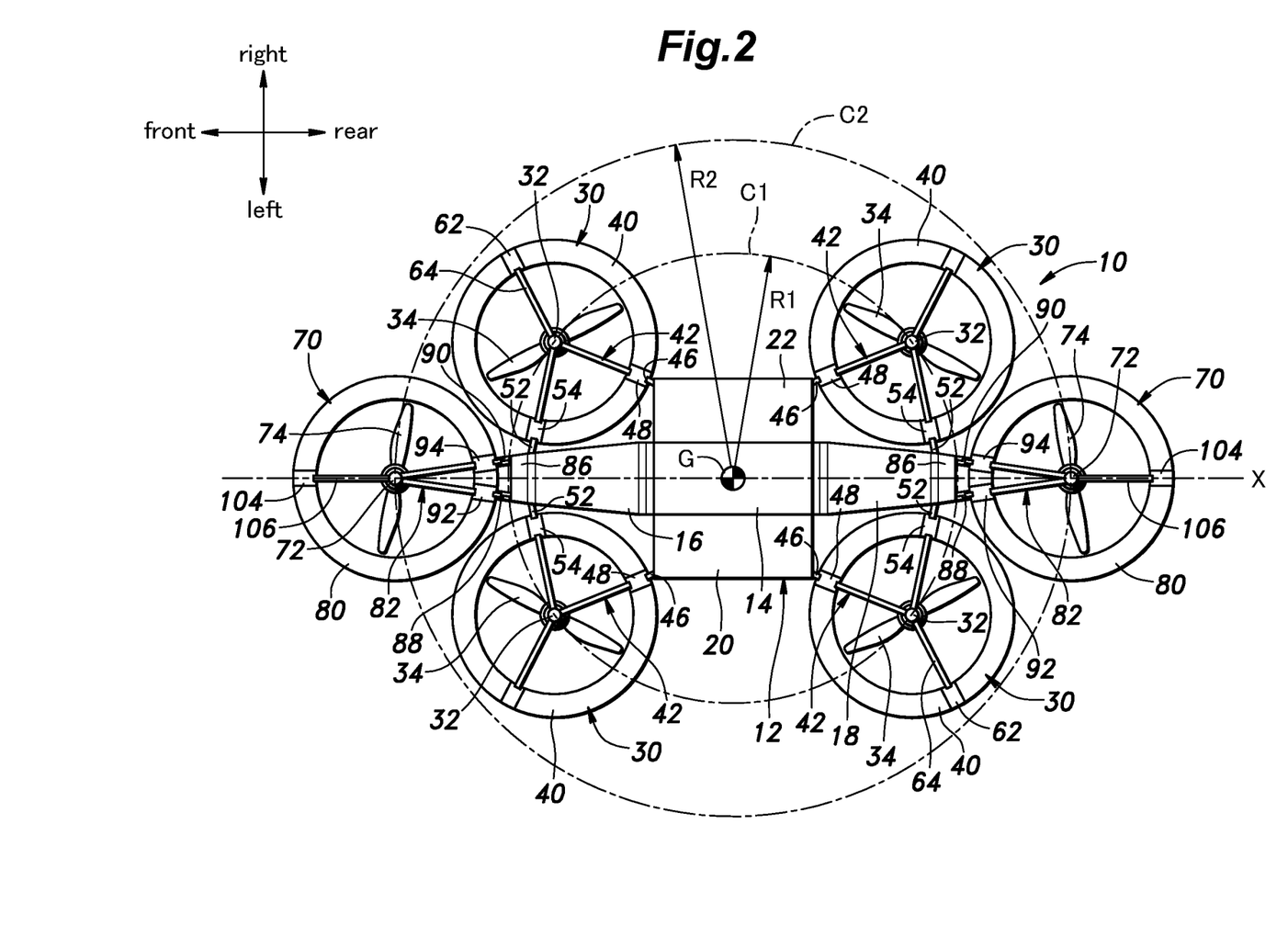
FIG. 2 is a plan view of the multicopter of this embodiment.

As shown in FIG. 2, the multicopter 10 is provided with two pairs of first lift generators 30 arranged on a first concentric circle C1 centered substantially around the gravitational center G of the machine body 12 and having a radius of R1 in a front part and a rear part of the machine body 12 in a bilateral symmetry, and a pair of second lift generators 70 arranged on a second concentric circle C2 centered substantially around the gravitational center G of the machine body 12 and having a radius of R2 greater than the radius R1, and in a front part and a rear part of the machine body 12 along a central axial line X extending in the fore and aft direction of the machine body 12.

Figure 1:
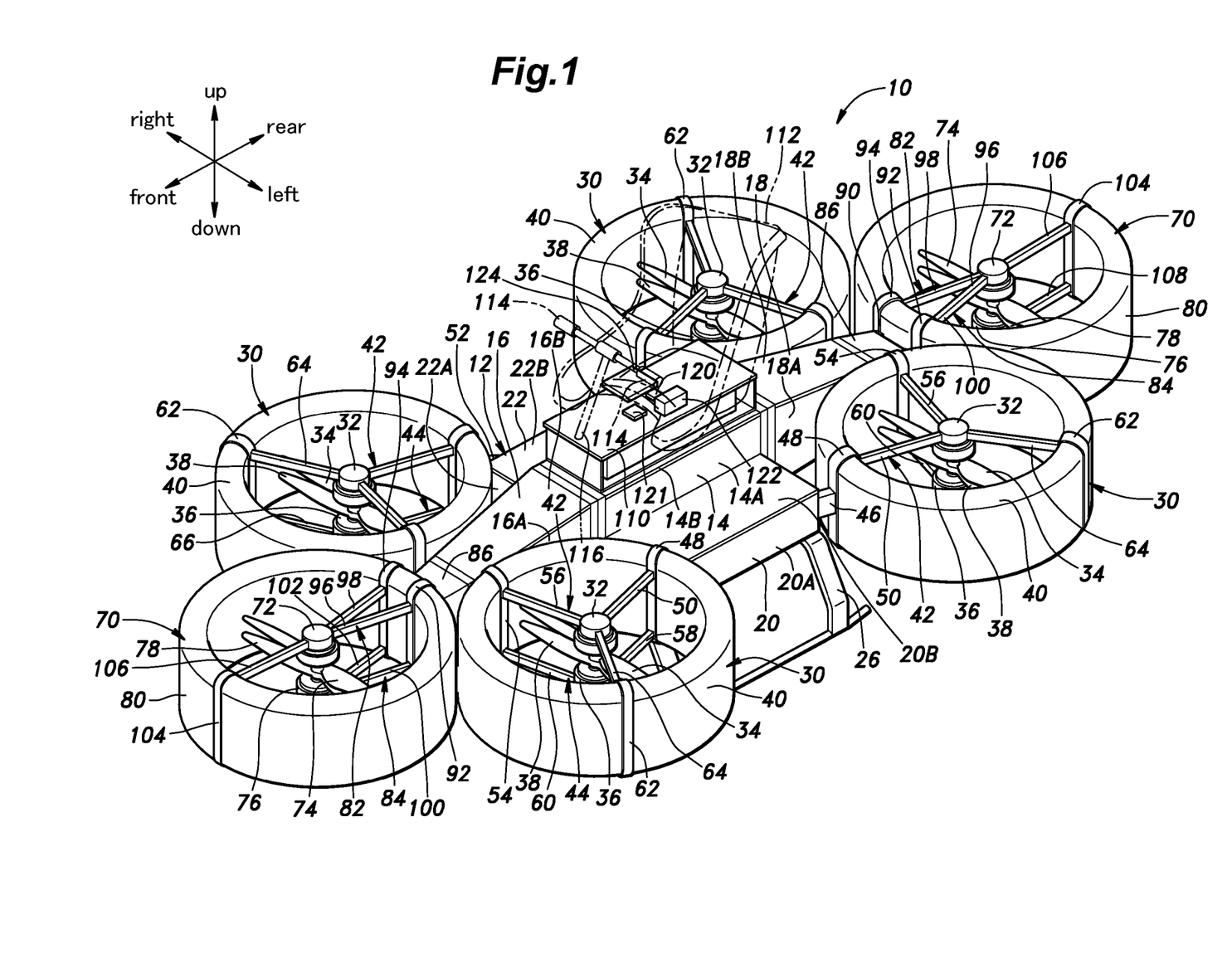
FIG. 1 is a perspective view showing one embodiment of a multicopter according to the present invention.

As shown in FIG. 1, the first lift generators 30 each include an upper electric motor 32 facing downward, an upper rotating blade 34 fitted to a rotary shaft of the upper electric motor 32 to be rotatively driven by the upper electric motor 32, a lower electric motor 36 facing upward and in a coaxial relationship to the upper electric motor 32, a lower rotating blade 38 fitted to a rotary shaft of the lower electric motor 36 to be rotatively driven by the lower electric motor 36, and an annular fan shroud 40 surrounding the upper rotating blade 34 and lower rotating blade 38, and having an open upper end and an open lower end. The fan shroud 40 is provided with a hollow structure for electric wiring.

Each first lift generator 30 is supported by the machine body 12 via an upper arm assembly 42 and a lower arm assembly 44 each having arm members extending from two different points on the machine body 12 and joined to each other at the center of the first lift generator 30 in a V-shape in plan view. Thus, each first lift generator 30 is individually supported by the machine body 12 via the upper arm assembly 42 and the lower arm assembly 44.

More specifically, the upper arm assembly 42 includes a bracket 46 (see FIG. 2) having a hollow structure and attached to an outboard end of a front part of the left machine body 20 or the right machine body 22, a band member 48 wrapped around a part of the fan shroud 40 and connected to the bracket 46, a hollow arm member 50 having one end connected to the band member 48 and another end connected to a central part of the upper electric motor 32 and extending in the radial direction with respect to the upper electric motor 32, another bracket 52 (see FIG. 2) having a hollow structure and attached to an outboard side of a front end of the front machine body 16 or an outboard side of a rear end of the rear machine body 18, another band member 54 surrounding the fan shroud 40 at a circumferentially different part thereof from the aforementioned band member 48 and connected to the bracket 52, and another hollow arm member 56 having one end connected to the other band member 54 and another end connected to a central part of the upper electric motor 32 and extending in the radial direction with respect to the upper electric motor 32.

The lower arm assembly 44 includes, in addition to the bracket 46, the band member 48, the other bracket 52 and the other band member 54, a hollow arm member 58 having one end connected to the band member 48 and another end connected to a central part of the lower electric motor 36 and extending in the radial direction with respect to the lower electric motor 36, and another hollow arm member 60 having one end connected to the other band member 54 and another end connected to a central part of the lower electric motor 36 and extending in the radial direction with respect to the lower electric motor 36.

The first lift generator 30 further includes yet another band member 62 wrapped around a part of the fan shroud 40 at a circumferentially different part thereof from the aforementioned band members 48 and 54, a hollow arm member 64 having one end connected to the band member 62 and another end connected to a central part of the upper electric motor 32 and extending in the radial direction with respect to the upper electric motor 32, and another hollow arm member 66 having one end connected to the yet other band member 62 and another end connected to a central part of the lower electric motor 36 and extending in the radial direction with respect to the lower electric motor 36.

As shown in FIG. 1, the second lift generators 70 each include an upper electric motor 72 facing downward, an upper rotating blade 74 fitted to a rotary shaft of the upper electric motor 72 to be rotatively driven by the upper electric motor 72, a lower electric motor 76 facing upward and in a coaxial relationship to the upper electric motor 72, a lower rotating blade 78 fitted to a rotary shaft of the lower electric motor 76 to be rotatively driven by the lower electric motor 76, and an annular fan shroud 80 surrounding the upper rotating blade 74 and lower rotating blade 78, and having an open upper end and an open lower end. The fan shroud 80 is provided with a hollow structure for electric wiring.

Each second lift generator 70 is supported by the machine body 12 via an upper arm assembly 82 and a lower arm assembly 84 each having arm members extending from two different points on the machine body 12 and joined to each other at the center of the second lift generator 70 in a V-shape in plan view. Thus, each second lift generator 70 is individually supported by the machine body 12 via the upper arm assembly 82 and the lower arm assembly 84.

Each first lift generator 30 is attached to the machine body 12 by the upper arm assembly 42 and the lower arm assembly 44 each having a V shape in plan view, and each second lift generator 70 is attached to the machine body 12 by the upper arm assembly 82 and the lower arm assembly 84 each having a V shape in plan view. Thereby, the first lift generator 30 and the second lift generator 70 can be supported by the machine body 12 in a more reliable and with a higher stiffness without increasing the complexity of the structure as compared to the case where the first lift generator 30 and the second lift generator 70 are each supported by using a single arm member.

More specifically, in each second lift generator 70, the upper arm assembly 82 includes a pair of brackets 88 and 90 (see FIG. 2) having a hollow structure and positioned on either side of a bracket mounting member 86 which also has a hollow structure and fixed to the front end of the front machine body 16 or the rear end of the rear machine body 18, a pair of band members 92 and 94 wrapped around the fan shroud 80 at two circumferentially different positions and connected to the respective brackets 88 and 90, and a pair of hollow arm members 96 and 98 having one ends connected to the respective band members 92 and 94 and other ends connected to the central part of the upper electric motor 72 and extending in the radial direction with respect to the upper electric motor 72.

The lower arm assembly 84 includes, in addition to the aforementioned brackets 88, 90, 92 and 94, a pair of hollow arm members 100 and 102 having one ends connected to the respective band members 92 and 94 and other ends connected to the central part of the lower electric motor 76 and extending in the radial direction with respect to the lower electric motor 76.

The front bracket mounting member 86 is formed in the shape of a truncated pyramidal box shape having a progressively decreasing width toward the front in a similar fashion as the front machine body 16, and the rear bracket mounting member 86 is formed in the shape of a truncated pyramidal box shape having a progressively decreasing width toward the rear in a similar fashion as the front bracket mounting member 86.

Furthermore, the second lift generator 70 includes a band member 104 which is wrapped around the outer periphery of the fan shroud 80 at a circumferentially different position from the band members 92 and 94, an arm member 106 having one end connected to the band member 104 and another end connected to the central part of the upper electric motor 72, and extending in the radial direction with respect to the upper electric motor 72, and another arm member 108 having one end connected to the band member 104 and another end connected to the central part of the lower electric motor 76, and extending in the radial direction with respect to the lower electric motor 76.

Owing to this arrangement of the first lift generators 30 and the second lift generators 70 described above, the fore and aft distance between the first lift generators 30 positioned in the front part of the machine body and the rear part of the machine body 12, and the fore and aft distance between the second lift generators 70 are greater than the lateral distance between the first lift generators 30 of each corresponding pair.

Owing to the arrangement of the first lift generators 30 described above, the front machine body 16 includes a part that extends into a space defined between the left and right first lift generators 30 at the front, and the rear machine body 18 includes a part that extends into a space defined between the left and right first lift generators 30 at the rear. As a result, the fore and aft length the multicopter 10 can be minimized. Furthermore, the left machine body 20 includes a part that extends into a space defined between the front and rear first lift generators 30 on the corresponding lateral side, and the right machine body 22 includes a part that extends into a space defined between the front and rear first lift generators 30 on the corresponding lateral side. As a result, the lateral width of the multicopter 10 can be minimized. Owing to these arrangements, the size reduction of the multicopter 10 and the weight reduction of the multicopter 10 associated with the size reduction thereof can be accomplished so that the speed performance and the acceleration performance can be improved.

Each second lift generator 70 includes a part overlapping with an adjacent one of the first lift generators 30 in side view. As a result, the fore and aft length the multicopter 10 can be minimized. Also, the fore and aft distance between the second lift generators 70 at the front and the second lift generators 70 at the rear can be increased so that the boarding and unboarding onto and from the occupant seat 112 can be facilitated.

The two first lift generators 30 and the single second lift generator 70 on the front side, as well as the two first lift generators 30 and the single second lift generator 70 on the rear side, form an isosceles triangle when the center points thereof are connected to each other in plan view, and stacked or packed in a staggered relationship in plan view so that the first lift generators 30 and the second lift generators 70 can be arranged with a minimum dead space. This also contributes to the compact design of the multicopter 10.

Moreover, the two first lift generators 30 and the single second lift generator 70 on the front side are arranged so as to surround the front machine body 16, and the two first lift generators 30 and the single second lift generator 70 on the rear side first lift generator 30 are arranged so as to surround the rear machine body 18 with the result that the first lift generators 30 and the second lift generators 70 can be attached to the machine body 12 in close proximity of the front machine body 16 or the rear machine body 18 by using relatively short arm members in a reliable manner.

Owing to the structure of the machine body 12 and the arrangement of the first lift generators 30 and the second lift generators 70 described above, the multicopter 10 has an anisotropy in having a substantially smaller lateral width than a fore and aft length so that the air resistance in flying forward which is the dominant flight direction of the multicopter 10 is substantially smaller than in flying laterally. As a result, the energy efficiency in flight can be improved, and energy consumption can be minimized.

A box-shaped seat stand 110 is mounted on the main machine body 14. The occupant seat 112 is attached to the seat stand 110 so as to face forward. The seat surface of the occupant seat 112 on the seat stand 110 is located higher than the upper surfaces of the left machine body 20 and the right machine body 22 so that the left machine body 20 and the right machine body 22 can be used as steps for the occupant climbing onto or climbing down the occupant seat 112 or as footrests for the occupant who is seated on the occupant seat 112. A fixed handle 116 including left and right grips 114 for an occupant seated on the occupant seat 112 is attached to a front part of the seat stand 110. A flight control unit (not shown in the drawings) is provided in the vicinity of the occupant seat 112 equipped with the fixed handle 116.

Since the first lift generators 30 and the second lift generators 70 are grouped tightly in the front part and the rear part of the machine frame, the accessibility for an occupant to the occupant seat 112 can be improved due to the positioning of the occupant seat 112 between the front group and the rear group of the first lift generators 30 and the second lift generators 70.

The box body 14A of the main machine body 14, the box body 20A of the left machine body 20, and the box body 22A of the right machine body 22 each receive a battery pack 130 of a rectangular configuration serving as a power source battery for the upper electric motors 32, 72 and the lower electric motors 36, 76 therein.

The main machine body 14, the left machine body 20, and the right machine body 22 are thus each conveniently used as a storage box for the battery pack 130. The left machine body 20 and the right machine body 22 also serve as steps for the boarding and unboarding of an occupant and footrests for the occupant, in addition to as storage boxes for the battery packs 130 so that the battery storage boxes, the steps, and the footrests are not required to be separately provided. This reduces the number of component parts, and reduces the weight of the multicopter 10.

The seat stand 110 forms a part of the main machine body 14. The seat stand 110 is provided with a three-axis gyro sensor 120, a three-axis acceleration sensor 121, a flight control unit 122, and an autonomous flight control unit 124. Thus, the gyro sensor 120, the flight control unit 122, and the autonomous flight control unit 124 are placed in a relatively safe, central part of the main machine body 14. The gyro sensor 120 is preferably positioned at the center of gravitational center G of the machine body 12 or at a position close to the center of gravitational center Gin plan view from the viewpoint of attitude control of the machine body 12.

Figure 3:
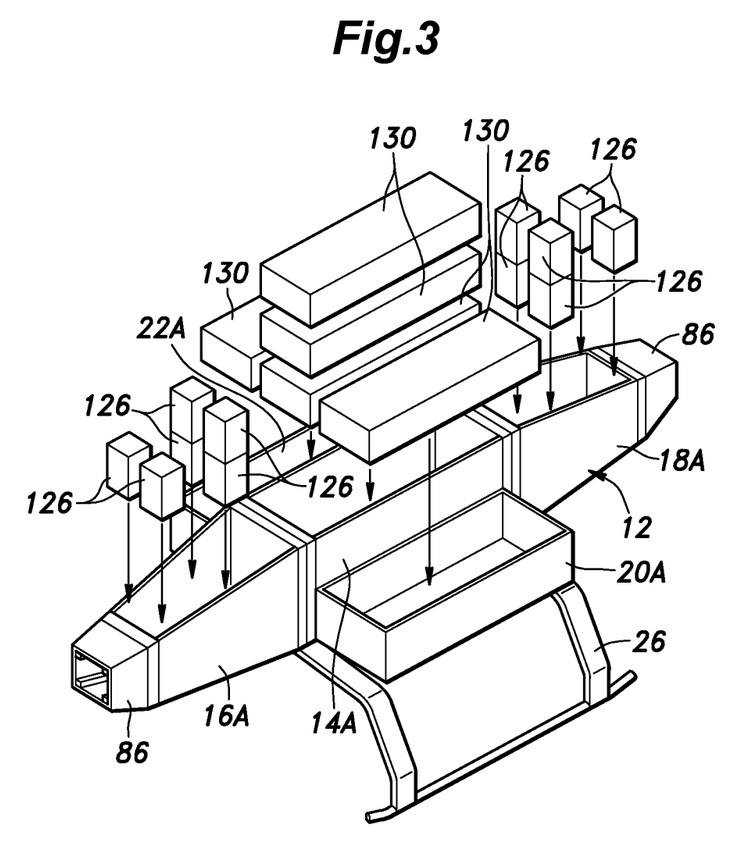
FIG. 3 is an exploded perspective view of a machine body of the multicopter of this embodiment.

As shown in FIG. 3, the box body 16A of the front machine body 16 and the box body 18A of the rear machine body 18 are provided with speed control units 126 for the upper electric motors 32 and the lower electric motors 36 of the first lift generators 30, and speed control units 126 for the upper electric motors 72 and the lower electric motors 76 of the second lift generators 70. The speed control units 126 are provided individually for the upper electric motors 32 and 72 and the lower electric motors 36 and 76 so that the speed control for the upper electric motors 32 and 72 and the lower electric motors 36 and 76 may be performed individually.

Since the fan shrouds 40 and 80, the upper arm assemblies 42 and 82, and the lower arm assemblies 44 and 84 each have a hollow structure, the electrical connection from the speed control units 126 to the upper electric motors 32, 72 and the lower electric motors 36, 76 is accomplished by passing cables (not shown in the drawings) through these hollow structures. The speed control units 126 are arranged at position close to the corresponding upper electric motors 32 and 72 and lower electric motors 36 and 76 so that the lengths of the cables (not shown in the drawings) that connect the speed control units 126 to the corresponding upper electric motors 32 and 72 and the lower electric motors 36 and 76 can be minimized.

By individually performing the speed controls of the upper electric motors 32 and 72 and the lower electric motors 36 and 76, the multicopter 10 is enabled to vertically ascend and descend in a horizontal attitude, to fly forward and backward via a pitch attitude control, and to fly laterally via a roll attitude control.

Such flight maneuvers can be also accomplished by the tilting of the machine body 12 via by the shifting of the weight of the occupant seated on the occupant seat 112. Since the width of the machine body 12 is limited, the machine body 12 can be easily tilted in the roll direction so that the maneuverability by weight shift is improved. Further, the gyro sensor 120 may detect the lateral weight shift of the occupant sitting on the occupant seat 112 so that the lateral flight control may be performed according to an output of the gyro sensor 120.

The fore and aft distance between the first lift generators 30 located in the front part and the first lift generators 30 located in the rear part, and the fore and aft distance between the second lift generator 70 located in the front part and the second lift generator 70 located in the rear part are larger than the lateral distance between the first lift generators 30 that are in a bilateral symmetry to each other so that the multicopter 10 has a greater sensitivity to a moment in the pitch direction than to a moment in the roll direction. Thus, an anisotropy that causes the multicopter 10 to move more readily in the fore and aft direction than in the lateral direction without compromising the compact and light weight design and with a highly simple structure is achieved. As a result, the speed performance and the acceleration performance in the fore and aft direction can be improved.

In other words, owing to the particular arrangement of the first lift generators 30 and the second lift generators 70, the sensitivity of the attitude control in the pitch direction is higher than the sensitivity of the attitude control in the roll direction so that the attitude control in the pitch direction can be performed in a more efficient manner than the attitude control in the roll direction. As a result, wasteful consumption of energy can be avoided, energy efficiency for the flight can be improved, and overall consumption energy can be minimized.

Figure 4:
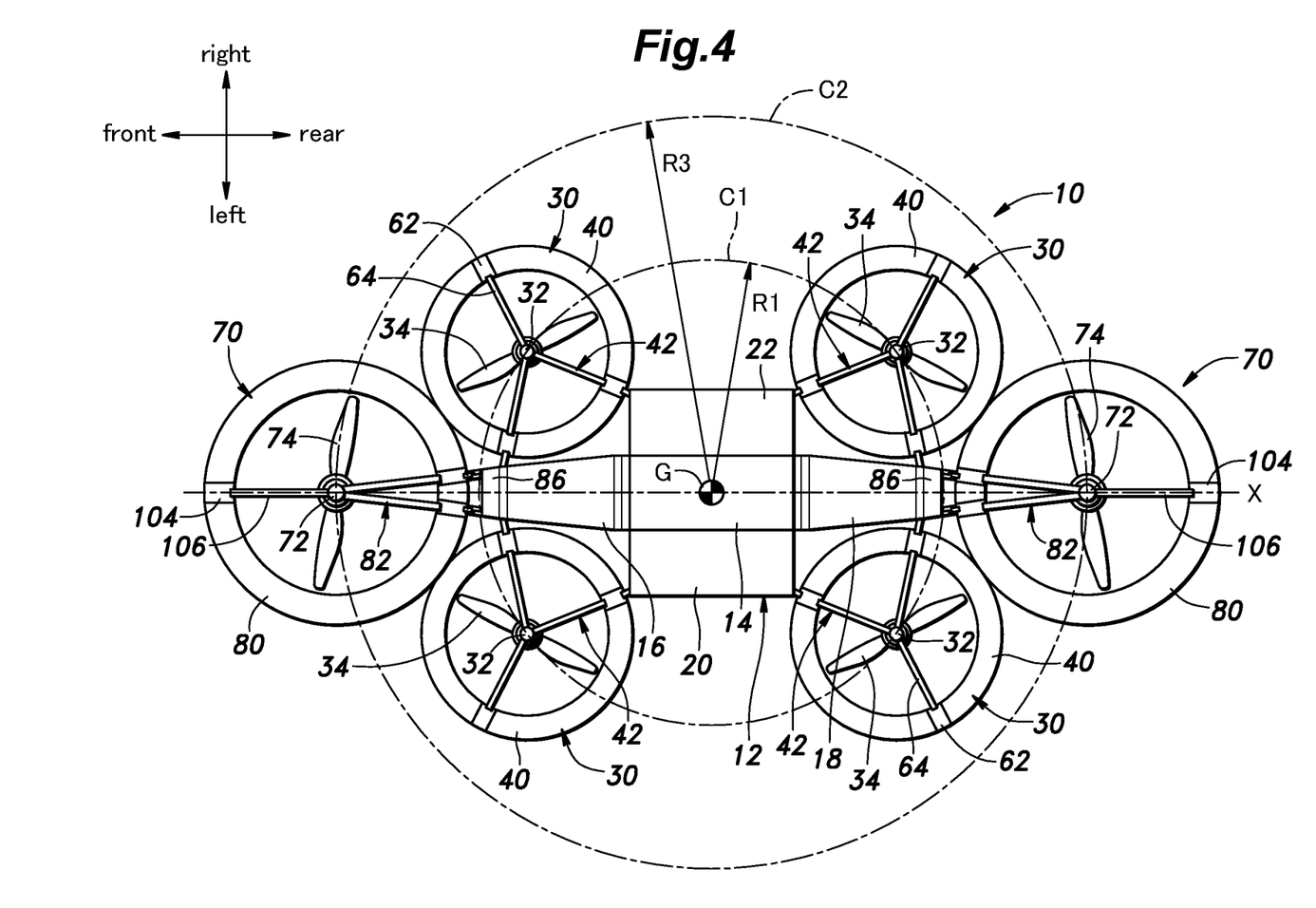
FIG. 4 is a perspective view of a multicopter according to another embodiment of the present invention.

A multicopter according to another embodiment of the present invention is described in the following with reference to FIG. 4. In FIG. 4, parts corresponding to those in FIG. 2 are denoted with like reference numerals as those in FIG. 2, and description of such parts will be omitted.

In the present embodiment, the radius of the rotating blades 74 of the second lift generators 70 is larger than the radius of the rotating blades 34 of the first lift generators 30. In other words, the second lift generators 70 are larger than the first lift generators 30. Due to the increase in the size of the second lift generators 70, the second concentric circle C2 on which the second lift generators 70 are positioned has a larger radius R3 than the second lift generators 70 of the foregoing embodiment.

In the present embodiment, the acceleration performance in the fore and aft flight can be improved owing to the increased output of the second lift generators 70 which is caused by the increase in the size of the second lift generators 70.

The present invention has been described in terms of specific embodiments, but is not limited by such embodiments, and can be varied in various ways without departing from the spirit of the present invention. For example, a luggage carrier may be provided on the main machine body 14 for carrying luggage. The first lift generators 30 and the second lift generators 70 are not limited to those using inverted double rotating blades, but may also use a single rotating blade, and may consist of other types of lift generators. The numbers of the first lift generators 30 and the second lift generators 70 are not limited to 4 and 2, respectively. It suffices that if the numbers of the first lift generators 30 and the second lift generators 70 are N and M, N>M. The various components of the foregoing embodiments are not entirely essential for the present invention, and may be substituted or omitted without departing from the scope of the present invention.

GLOSSARY OF TERMS

| | |
|---|---|
| 10: multicopter | 12: machine body |
| 14: main machine body | 14A: box body |
| 14B: lid plate | 16: front machine body |
| 16A: box body | 16B: lid plate |
| 18: rear machine body | 18A: box body |
| 18B: lid plate | 20: left machine body |
| 20A: box body | 20B: lid plate |
| 22: right machine body | 22A: box body |
| 22B: lid plate | 26: leg assembly |
| 30: first lift generator | 32: upper electric motor |
| 34: upper rotating blade | 36: lower electric motor |
| 38: lower rotating blade | 40: fan shroud |
| 42: upper arm assembly | 44: lower arm assembly |
| 46: bracket | 48: band body |
| 50: arm member | 52: bracket |
| 54: band member | 56: arm member |
| 58: arm member | 60: arm member |
| 62: band body | 64: arm member |
| 66: arm member | 70: second lift generator |
| 72: upper electric motor | 74: upper rotating blade |
| 76: lower electric motor | 78: lower rotating blade |
| 80: fan shroud | 82: upper arm assembly |
| 84: lower arm assembly | 86: bracket mounting member |
| 88: bracket | 90: bracket |
| 92: band member | 94: band member |
| 96: arm member | 98: arm member |
| 100: arm member | 102: arm member |
| 104: band member | 106: arm member |
| 108 arm member | 110: seat stand |
| 112: occupant seat | 114: clip |
| 116: fixed handle | 120: gyro sensor |
| 121: acceleration sensor | 122: flight control unit |
| 124: autonomous flight control unit | 126: speed control unit |
| 130: battery pack (power source battery) | |

The invention claimed is:

1. A multicopter, comprising:
   a machine body;
   an N number of first lift generators arranged on a first concentric circle centered substantially around a gravitational center of the machine body and in a front part and a rear part of the machine body in a bilateral symmetry; and an M number of second lift generators arranged on a second concentric circle centered substantially around the gravitational center of the machine body and having a larger diameter than the first concentric circle, and in a front part and a rear part of the machine body on a central axial line extending in a fore and aft direction of the machine body, N being greater than M, wherein the first lift generators and the second lift generators are each supported by the machine body via a pair of arms extending from two different points on the machine body and joined to each other at the corresponding lift generator in a shape of letter V in plan view.

2. The multicopter according to claim 1, wherein a fore and aft distance between one of the first lift generators located in the front part and one of the first lift generators located in the rear part, and a fore and aft distance between one of the second lift generators located in the front part and one of the second lift generators located in the rear part are larger than a lateral distance between a pair of the first lift generators that are in a bilateral symmetry to each other.

3. The multicopter according to claim 1, wherein the first lift generators and the second lift generators are each provided with a rotary blade, the rotary blade of the second lift generators having a greater radius than the rotary blade of the first lift generators.

4. The multicopter according to claim 1, wherein each second lift generator includes a part overlapping with an adjacent one of the first lift generators in side view.

5. A multicopter, comprising:

a machine body;

an N number of first lift generators arranged on a first concentric circle centered substantially around a gravitational center of the machine body and in a front part and a rear part of the machine body in a bilateral symmetry; and an M number of second lift generators arranged on a second concentric circle centered substantially around the gravitational center of the machine body and having a larger diameter than the first concentric circle, and in a front part and a rear part of the machine body on a central axial line extending in a fore and aft direction of the machine body, N being greater than M, wherein the machine body includes a main machine body having a rectangular box shape elongated in the fore and aft direction, a front machine body extending forward from a front end of the main machine body and having a progressively narrower width toward a front end thereof, the front machine body having a part extending into a front space defined between a pair of the first lift generators that are in a bilateral symmetry to each other in the front part, the part of the front machine body extending into the front space being located within the first concentric circle, a rear machine body extending rearward from a rear end of the main machine body and having a progressively narrower width toward a rear end thereof, the rear machine body having a part extending into a rear space defined between a pair of the first lift generators that are in a bilateral symmetry to each other in the rear part, the part of the rear machine body extending into the rear space being located within the first concentric circle, a left machine body having a rectangular box shape elongated in the fore and aft direction and provided on a left side of the main machine body, the left machine body having a part extending into a left space defined between a pair of the first lift generators that are located one behind another on a corresponding lateral side, the part of the left machine body extending into the left space being located within the first concentric circle, and a right machine body having a rectangular box shape elongated in the fore and aft direction and provided on a right side of the main machine body, the right machine body having a part extending into a right space defined between a pair of the first lift generators that are located one behind another on a corresponding lateral side, the part of the right machine body extending into the right space being located within the first concentric circle.

6. A multicopter, comprising:

a machine body;

an N number of first lift generators arranged on a first concentric circle centered substantially around a gravitational center of the machine body and in a front part and a rear part of the machine body in a bilateral symmetry; and an M number of second lift generators arranged on a second concentric circle centered substantially around the gravitational center of the machine body and having a larger diameter than the first concentric circle, and in a front part and a rear part of the machine body on a central axial line extending in a fore and aft direction of the machine body, N being greater than M, wherein the machine body includes a main machine body having a rectangular box shape elongated in the fore and aft direction, a front machine body extending forward from a front end of the main machine body and having a progressively narrower width toward a front end thereof, the front machine body having a part extending into a space defined between a pair of the first lift generators that are in a bilateral symmetry to each other in the front part, a rear machine body extending rearward from a rear end of the main machine body and having a progressively narrower width toward a rear end thereof, the rear machine body having a part extending into a space defined between a pair of the first lift generators that are in a bilateral symmetry to each other in the rear part, a left machine body having a rectangular box shape elongated in the fore and aft direction and provided on a left side of the main machine body, the left machine body having a part extending into a space defined between a pair of the first lift generators that are located one behind another on a corresponding lateral side, and a right machine body having a rectangular box shape elongated in the fore and aft direction and provided on a right side of the main machine body, the right machine body having a part extending into a space defined between a pair of the first lift generators that are located one behind another on a corresponding lateral side, wherein the main machine body has a greater height than the left machine body and the right machine body, and a seat for an occupant is positioned on the main machine body, the left machine body and the right machine body each serving as a footrest for the occupant seated on the seat.

7. The multicopter according to claim 5, wherein the first lift generators and the second lift generators are each provided with a rotating blade and an electric motor for rotatively driving the rotating blade, the main machine body, and the left machine body and the right machine body each receive a power source battery for powering the electric motor therein.

8. The multicopter according to claim 7, wherein the main machine body is provided with at least one of a gyro sensor, an acceleration sensor, and a flight control unit, and the front machine body and the rear machine body are each provided with a speed control unit for the corresponding electric motors.

\* \* \* \* \*